United States Patent
Kaushik et al.

(10) Patent No.: US 10,725,691 B1
(45) Date of Patent: Jul. 28, 2020

(54) DYNAMIC RECYCLING ALGORITHM TO HANDLE OVERLAPPING WRITES DURING SYNCHRONOUS REPLICATION OF APPLICATION WORKLOADS WITH LARGE NUMBER OF FILES

(71) Applicant: NetApp Inc., Sunnyvale, CA (US)

(72) Inventors: Akhil Kaushik, Bangalore (IN); Anoop Chakkalakkal Vijayan, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 0 days.

(21) Appl. No.: 16/288,437

(22) Filed: Feb. 28, 2019

(51) Int. Cl.
*G06F 13/00* (2006.01)
*G06F 3/06* (2006.01)

(52) U.S. Cl.
CPC ............ *G06F 3/065* (2013.01); *G06F 3/0604* (2013.01); *G06F 3/067* (2013.01); *G06F 3/0638* (2013.01)

(58) Field of Classification Search
CPC ........ G06F 3/065; G06F 3/0638; G06F 3/067; G06F 3/0604
See application file for complete search history.

(56) References Cited

U.S. PATENT DOCUMENTS

| | | | | |
|---|---|---|---|---|
| 8,285,956 B2 * | 10/2012 | Ozdemir | ............. | G06F 11/2074 711/162 |
| 2005/0283658 A1 * | 12/2005 | Clark | .................. | G06F 11/2028 714/11 |
| 2009/0307166 A1 * | 12/2009 | Routray | .................... | G06N 5/04 706/46 |
| 2010/0049926 A1 * | 2/2010 | Fuente | ................ | G06F 11/2064 711/162 |
| 2014/0040206 A1 * | 2/2014 | Ramakrishnan | .... | G06F 11/2097 707/640 |
| 2016/0224609 A1 | 8/2016 | Seekircher et al. | | |
| 2017/0161350 A1 | 6/2017 | Calder et al. | | |

* cited by examiner

*Primary Examiner* — Jing-Yih Shyu
(74) *Attorney, Agent, or Firm* — Cooper Legal Group, LLC

(57) ABSTRACT

Techniques are provided for overlapping write handling. Overlapping write managers are used to maintain the order that write operations are executed at a first computing environment and replicated to a second computing environment. Overlapping write managers are pre-allocated as available for managing overlapping write operations. A mapping is used to track what overlapping write managers are currently allocated for particular file handles of files. Thus, if an incoming write operation targets a file handle of an already allocated overlapping write manager, then that overlapping write manager is used to execute and replicate the incoming write operation so that the order of execution of overlapping writes by the second computing environment is the same as at the first computing environment. If there is no allocated overlapping write manager for the file handle, then a new overlapping write manager is allocated and utilized.

20 Claims, 8 Drawing Sheets

DYNAMIC RECYCLING ALGORITHM TO HANDLE OVERLAPPING WRITES DURING SYNCHRONOUS REPLICATION OF APPLICATION WORKLOADS WITH LARGE NUMBER OF FILES

BACKGROUND

Many storage systems may implement data replication and/or other redundancy data access techniques for data loss protection and non-disruptive client access. For example, a first computing device may be configured to provide clients with primary access to data stored within a first storage device and/or other storage devices. A second computing device may be configured as a backup for the first computing device in the event the first computing device fails. Data may be replicated from the first computing device to the second computing device. In this way, the second computing device can provide clients with access to replicated data in the event the first computing device fails.

One type of replication is asynchronous replication. When the first computing device receives an operation from a client device, the first computing device transmits a replication of the operation to the second computing device for execution. Irrespective of whether the second computing device has executed the replicated operation, the first computing device will transmit an acknowledgment of successful performance of the operation to the client device once the first computing device has executed the operation.

Another type of replication is synchronous replication, which provides a greater level of data protection guarantees, such as a zero recovery point objective (RPO). This is because the first computing device does not transmit the acknowledgment until the operation has been executed by the first computing device and the replication operation has been executed or acknowledged by the second computing device. In this way, two copies of data and/or metadata resulting from the operation are maintained before the client receives acknowledgment that the operation was successful.

DETAILED DESCRIPTION

Figure 1:
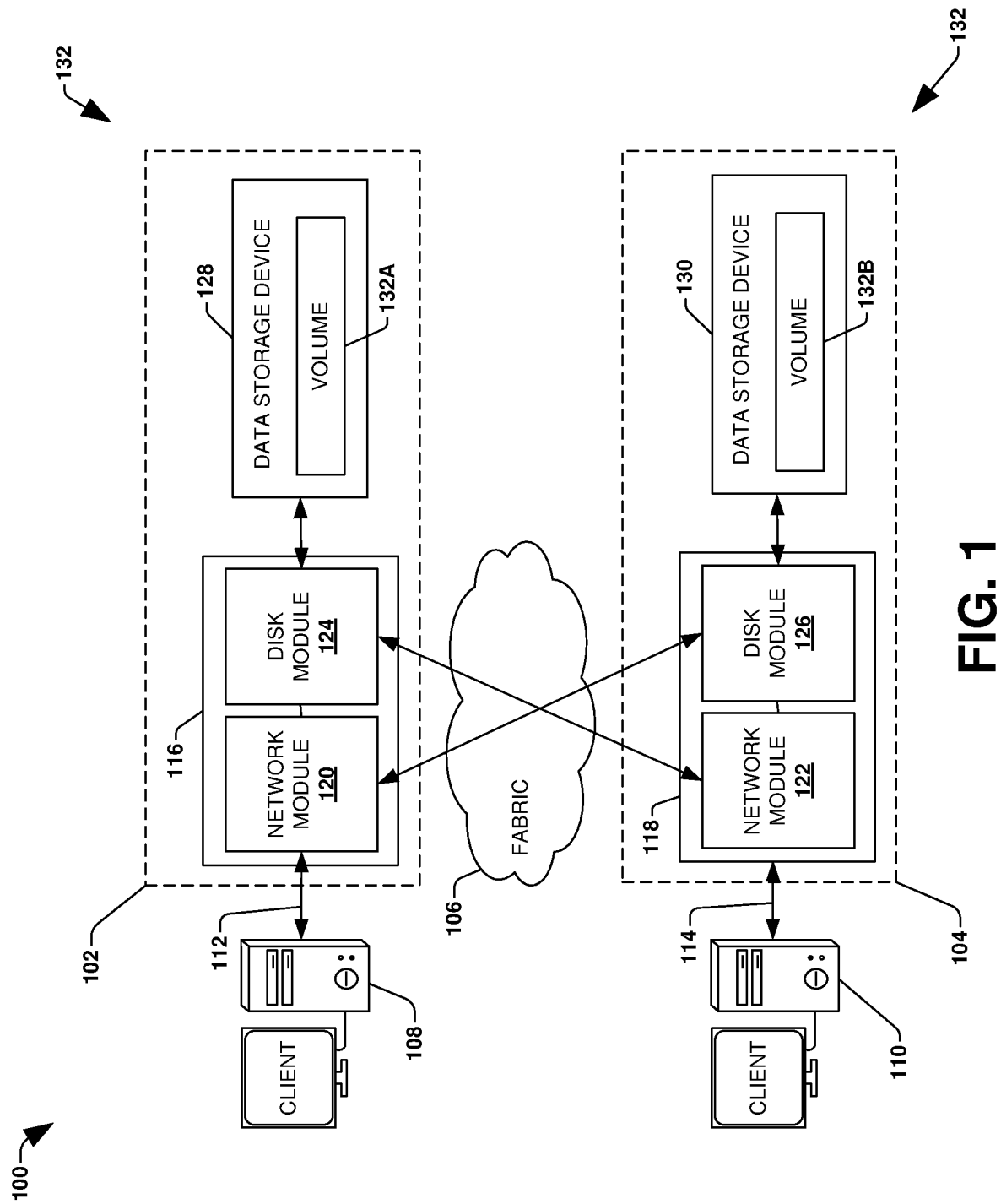
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

In asynchronous replication, incremental changes to a storage object, such as a volume, a file, a directory, a defined set of files or directories, a file system, or a storage virtual machine comprising a plurality of volumes stored across one or more nodes of a cluster, are replicated from the storage object to a replicated storage object. In synchronous replication, when an operation is received from a client device (e.g., a write operation targeting the storage object), the operation is split to create a replicated operation that is a replication of the operation. The operation is executed upon the storage object, such as by a first computing device managing the storage object. The replicated operation is executed upon the replicated storage object, such as by a second computing device managing the replicated storage object. The operation is not acknowledged to the client device as being complete until both the operation and the replicated operation have successfully been executed upon the storage object and the replicated storage object.

Accordingly, methods and/or systems are provided herein that improve synchronous replication by dynamically allocating and recycling file range locks, neutralizing replication errors without going out of sync, and handling misaligned holes and writes beyond an end of file during a quick reconcile process. Synchronous replication may be implemented for first storage object hosted by a first computing environment (e.g., a first node) and a second storage object hosted by a second computing environment (e.g., a second node) as a replica of the first storage object. A synchronous replication relationship is established between the first storage object and the second storage object.

In an embodiment of dynamically allocating and recycling file range locks, overlapping writes can occur where multiple parallel writes (e.g., inflight write operations not yet fully executed and replicated) target overlapping ranges of the first storage object. The order that the overlapping writes are executed upon the first storage object needs to be maintained when replicated to the second storage object. Otherwise a divergence will occur between the first storage object and the second storage object. Order of execution is preserved at the second storage object by serializing the overlapping writes using a range lock. A single range lock is used per storage object (per file). However, this does not scale well for storage environments having a large number of files. Accordingly, the present system can dynamically allocate and recycle range locks as needed in order to scale to storage environments having large numbers of files.

An overlapping write manager is used to maintain the order of execution of writes between the first storage object and the second storage object using range locks. In an example, an overlapping write manager allocator is setup and used to pre-allocate a percentage of a total number of overlapping write managers to be available for managing overlapping writes targeting files of the first computing environment (e.g., the first storage object managed by the first node) and replicated to replicate files stored by the second computing environment (e.g., the second storage object managed by the second node).

In an embodiment of pre-allocating overlapping write managers, when an outstanding allocation of overlapping write managers (e.g., overlapping write managers being used by incoming writes) grows beyond a threshold (e.g., 10%, 20%, etc.), then additional overlapping write managers are allocated for use by overlapping writes.

A mapping is used to track allocated overlapping write managers. The mapping comprises file handles of files for which allocated overlapping write managers have been pre-allocated (drawn) from the overlapping write manager allocator, and thus are available for use to obtain range locks for corresponding files. File handles are used as a key to the mapping. When I/O to a file is received, the mapping is search using a file handle of the file to see if an overlapping write manager for the file handle of the file is already allocated. For example, the mapping is evaluated using a file handle of a file targeted by an incoming write to determine whether an overlapping write manager is already allocated for the file handle.

If the overlapping write manager is already allocated, then the overlapping write manager is utilized to acquire a range lock for a range of the file to be modified by the incoming write. The incoming write is serially executed upon the file and is serially replicated to a replicated file using the range lock (e.g., the replicate file maintained as a replica of the file). In this way, the range lock is used to block overlapping writes targeting at least a portion of the range of the file targeted by the incoming write (e.g., overlapping replicated writes targeting the replicated file). If the mapping does not comprise an entry for the file handle, then there is no pre-allocated overlapping write manager for the file handle. Thus, a new overlapping write manager is allocated by the overlapping write manager allocator. The incoming write uses the new overlapping write manager to obtain a range lock for the range of the file for serial execution and replication. A new entry is created within the mapping to track the new overlapping write manager allocated for the file handle.

In an embodiment, overlapping write managers are recycled to return overlapping write managers back to the overlapping write manager allocator. For example, once the incoming write operation has completed execution upon the file and completed replication to the replicated file, the range lock is released. The overlapping write manager becomes available for use by other writes. If no outstanding writes having range locks for the file, then the entry is removed from the mapping for the overlapping write manager and the overlapping write manager is deallocated. If there are no outstanding writes having references to the overlapping write manager (e.g., there are no writes attempting to acquire range locks for the file), then the entry is removed from the mapping for the overlapping write manager and the overlapping write manager is deallocated.

During recycling of overlapping write managers, an entry for an overlapping write manager is removed from the mapping and the overlapping write manager is returned to a free pool of pre-allocated overlapping write managers. In an embodiment of recycling overlapping write managers, overlapping write managers are deallocated until a number of allocated overlapping write managers is less than a threshold, which reduces an allocation percentage. In an embodiment, the total number of overlapping write managers is maintained within the pool. A number of allocated overlapping write managers is reduced from the pool such as during recycling to free computing resources (e.g., recycling stops when an allocation percentage is low such as 20%).

In an embodiment, replication errors for synchronous replication are neutralized. A first storage object is maintained by a first computing environment and a second storage object is maintained by a second computing environment as a replica of the first storage object. An operation is received while the first storage object and the second storage object are in a synchronous replication state. The operation is executed upon the first storage object and is replicated as a replicated operation for execution upon the second storage object.

The second computing environment may return a first error for the replicated operation. The first error may indicate that the replicated operation did not successfully execute, such as due to a file system error (e.g., the replicated operation targets a file handle that is stale because a targeted file has been delete; the replicated operation would increase a size of a file beyond a supported file size; etc.). Upon receiving the first error for the replicated operation, the operation is refrained from being aborted from being executed upon the first storage object (e.g., the operation would normally be aborted due to the first error). The first storage object and the second storage object are refrained from being transitioned to an out of sync state based upon the first error. The synchronous replication would normally be transitioned to an out of sync state, and thus a zero recovery point objective (RPO) provided by synchronous replication would be disrupted.

Synchronous replication waits until both the operation and the replicated operation have finished. A second error may be received for the operation from the first computing environment. If the first error and the second error are the same error, then the replication operation is deemed to be successfully completed so that the synchronous replication is maintained and not transitioned to the out of sync state. Accordingly, the first storage object and the second storage object are maintained in a synchronous replication state. The same error is returned to the client device as the operation was a failure from client device's perspective. However, if the first error and the second error are different errors, the first storage object and the second storage object could be different (inconsistent) due to different results from the different errors. The synchronous replication state will be transitioned to an out of sync state. The client device is responded to with the error from the first (primary) computing environment.

In an embodiment of handling situations where no response is returned for the replicated operation, the second computing environment maintains a failed ops cache of failed operations and error codes for each failed operation. Sequence numbers assigned to replicated operations are used as a key for the failed ops cache. If the first computing environment does not receive a response for the replicated operation, then a retry of the replicated operation with a same sequence number will be transmitted to the second computing environment. If a sequence number of the retry replicated operation is specified by an entry/mapping within the failed ops cache as mapping the replicated operation to an error code, then the error code is transmitted to the first computing environment. This is because the second computing environment already attempted to execute the replicated operation and the error code was generated. Thus, since the retry replicated operation is a retry of the replicated operation (e.g., the second computing environment may have attempted to return the error code for the replicated operation but a network failure cause the first computing device to not receive the error code and thus the first computing environment retried the replicated operation after a timeout period), the retry replicated operation is not executed and the error code is returned.

In an embodiment of performing a quick reconcile operation, misaligned holes and writes beyond an end of a storage object (e.g., an end of file of a file) are handled. The quick reconcile operation is performed if an operation fails to execute upon a first storage object and a replicated operation of the operation succeeds at executing upon a second storage object maintained as a replica of the first storage object. The quick reconcile operation is executed to read "old" data from the first storage object and write the "old" data from the first storage object to the second storage object (e.g., effectively undoing the execution of the replicated operation) so that the storage objects are consistent. When the data is being read from the first storage object, the data could have misaligned holes that do not start and/or end at an aligned offset, such as at 4 kb aligned offsets. Synchronous replication, such as the quick reconcile operation, cannot handle the misaligned holes because holes can only be punched at aligned offsets and lengths, such as at the 4 kb aligned offsets. Further, if the failed operation was a write operation to a range beyond an end of file, then the quick reconcile operation cannot read that data from the first storage object.

Accordingly, the present system is capable of handling misaligned holes and writes beyond an end of file (e.g., an end of a storage object). In an example of handling misaligned holes, a read operation is executed against the first storage object at an offset and length of a write operation during a quick reconcile process to reconcile the first storage object and the second storage object. For example, the write operation was successfully replicated to the second storage object but failed to execute against the first storage object. Thus, the read operation is performed to read "old" data from the first storage object to write to the second storage object so that the storage objects are consistent.

A read response of the read operation is evaluated to determine whether the read response has a misaligned hole. If the read response comprises the misaligned hole (e.g., a first I/O vector entry is a hole and a start offset is not 4 kb aligned or a last I/O vector entry is a hole and an end offset is not 4 k aligned), then the read request is modified to align the misaligned hole.

If the misaligned hole is due to the first I/O vector entry having a misaligned start offset, then the start offset is rounded down to a block size used to store the second storage object (e.g., to 4 kb). If the misaligned hole is due to the last I/O vector entry having a misaligned end offset, then the end offset is rounded up to a nearest aligned block size value (e.g., to 4 kb) as a new length. The new read response (e.g., the "old" data read from the first storage object and modified to address any misaligned holes) is replicated to the second storage object.

In an example of handling writes beyond an end of file, the read response of the read operation is evaluated to determine whether an error code or length of read data indicates whether the read data is beyond an end of the first storage object. If the read response is completely beyond the end of the first storage object, then a truncate command with a size of the first storage object is executed upon the second storage object. A volume barrier or dependency graph is used to ensure that the truncate command is serially executed with respect to other inflight replicated operations targeting the second storage object.

If the read response is partially beyond the end of the first storage object, then data from a start offset until the end of file is read from the first storage object and replicated to the second storage object. A truncate command having a size of the first storage object is executed upon the second storage object. In an example, the replication of the data and the truncate command can be combined as a single command transmitted to the second computing environment for execution upon the second storage object. A flag or field within the command can be used to indicate that the truncate command is to be performed after the writing the replicate data. A volume barrier or dependency graph is used to ensure that the command such as the truncate command is serially executed with respect to other inflight replicated operations targeting the second storage object.

To provide for overlapping write handling, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 1328 associated with the data storage device 130.

It may be appreciated that overlapping write handling may be implemented within the clustered network environment 100. In an example, operations may be executed at node 116 and replayed at node 118. It may be appreciated that overlapping write handling may be implemented for and/or between any type of computing environment, and may be transferable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
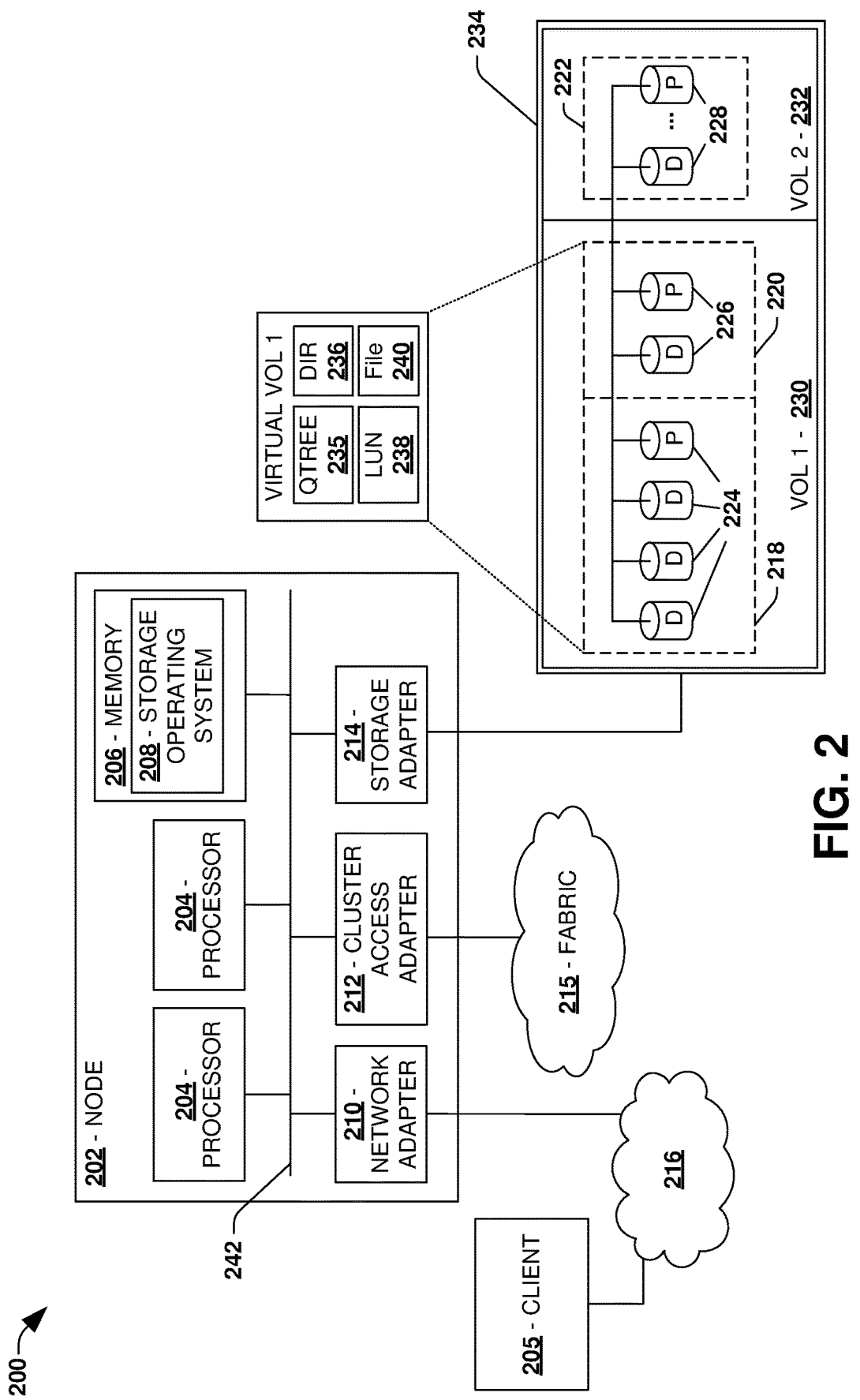
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that overlapping write handling may be implemented for the data storage system 200. It may be appreciated that overlapping write handling may be implemented for and/or between any type of computing environment, and may be transferable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
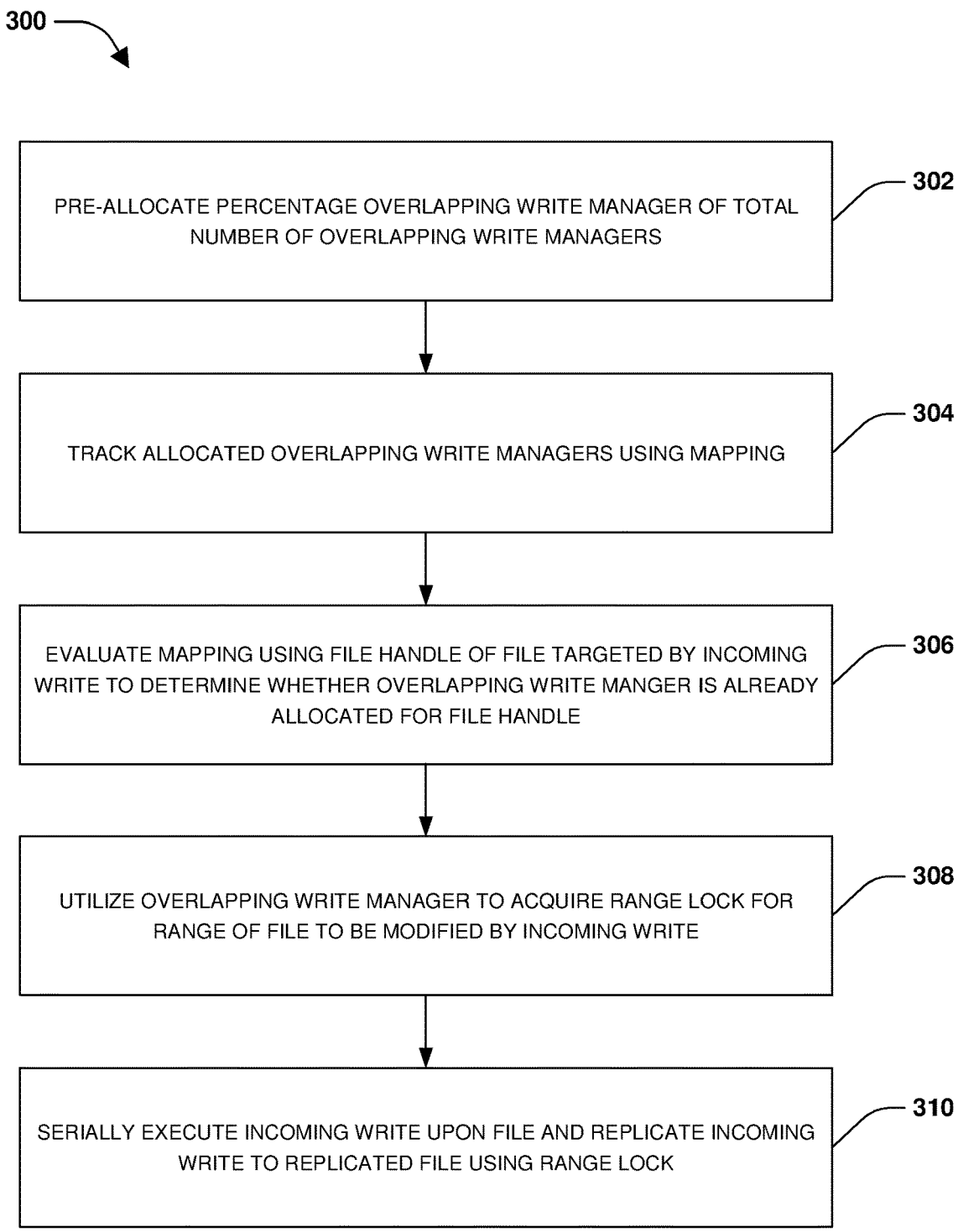
FIG. 3 is a flow chart illustrating an example method for overlapping write handling.
Figure 4A:
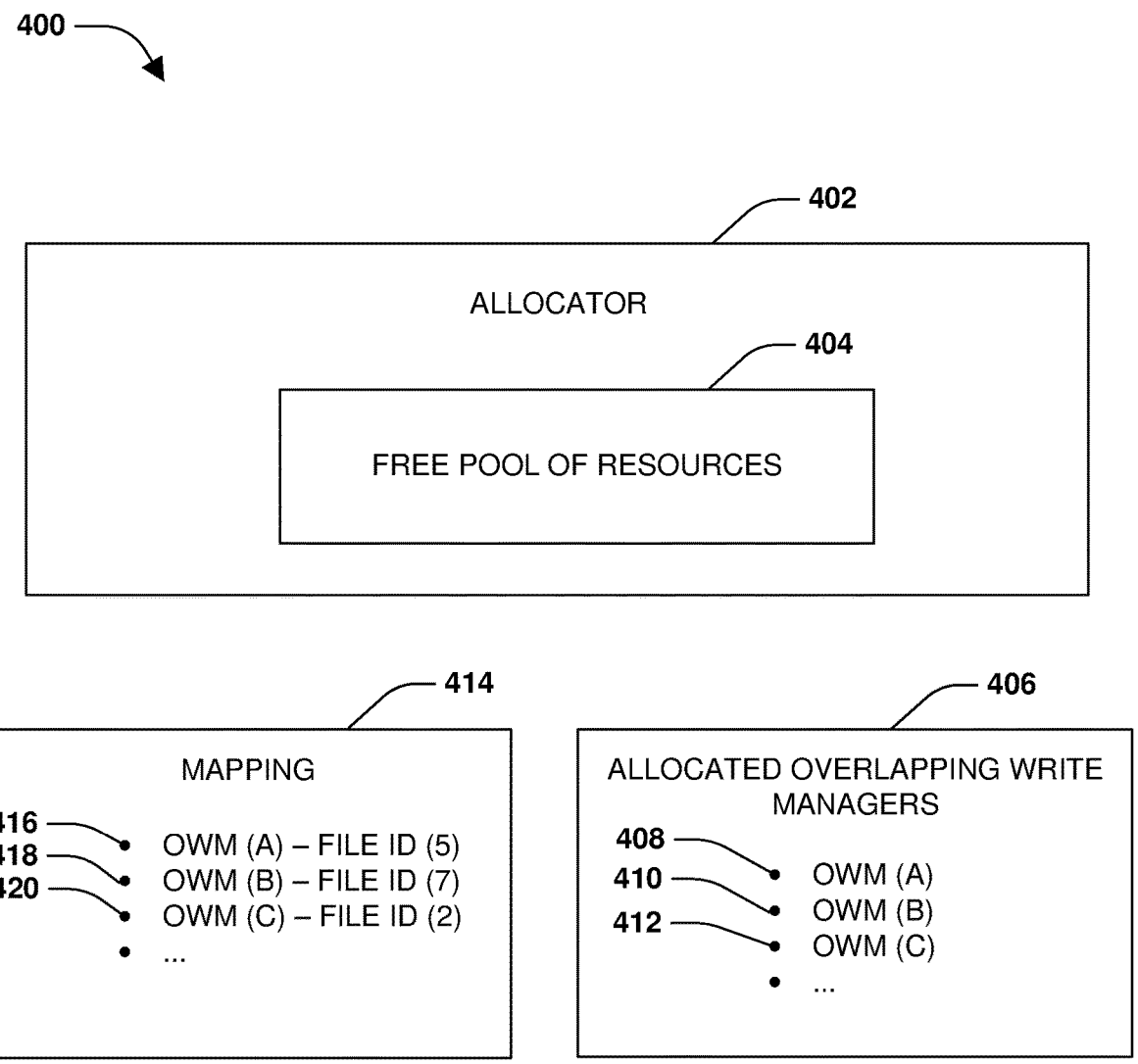
FIG. 4A is a component block diagram illustrating an example system for overlapping write handling.
Figure 4B:
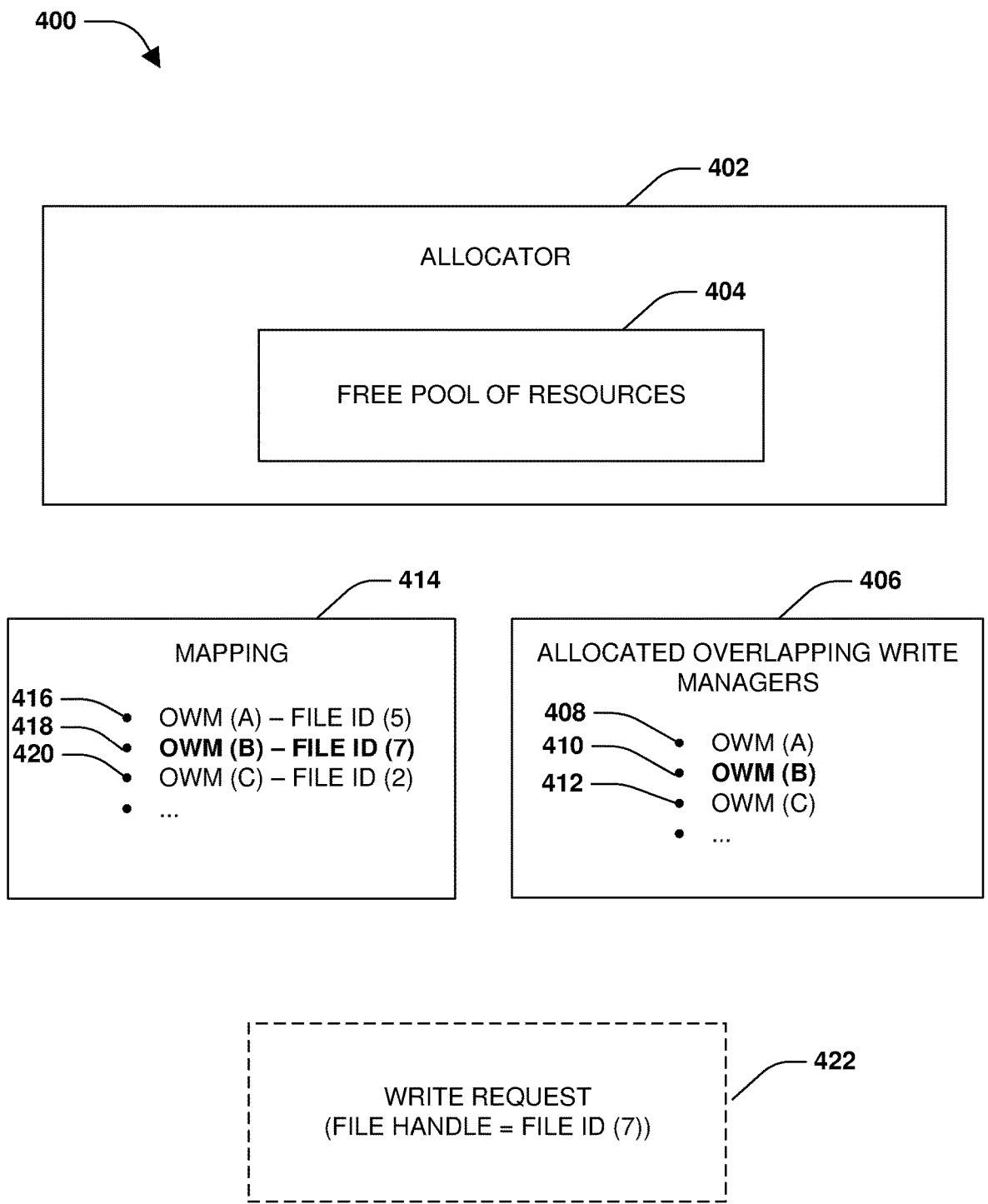
FIG. 4B is a component block diagram illustrating an example system for overlapping write handling, where a write request is processed using an existing overlapping write manager.
Figure 4C:
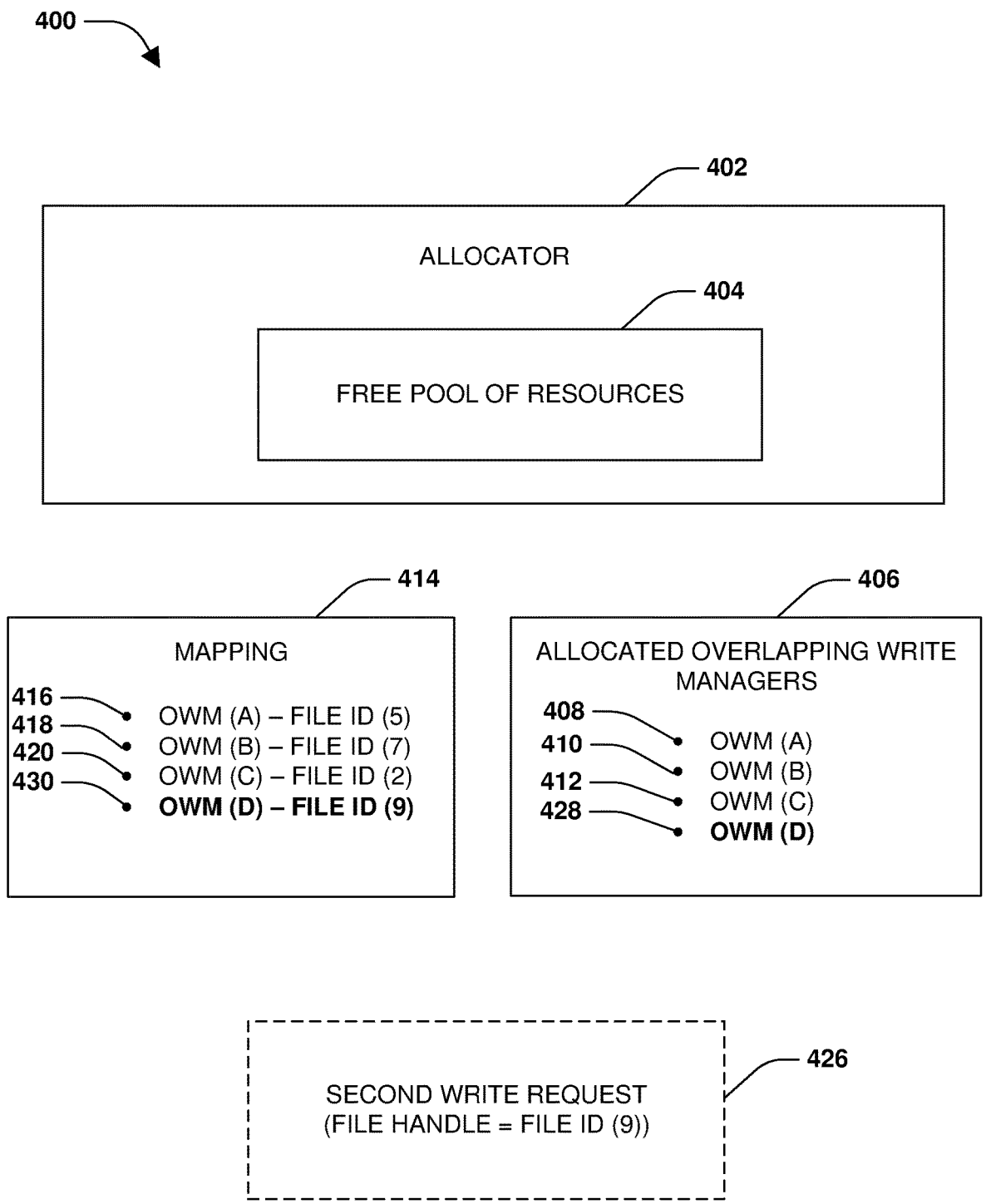
FIG. 4C is a component block diagram illustrating an example system for overlapping write handling, where a write request is processed using a new overlapping write manager.

One embodiment of overlapping write handling is illustrated by an exemplary method 300 of FIG. 3 and further described in conjunction with system 400 of FIGS. 4A-4C. A first computing environment comprises nodes, storage controllers, and/or other hardware and software (e.g., software as a service) configured to store and manage primary data, such as files accessed by hosts and client devices. A second computing environment comprises nodes, storage controllers, and/or other hardware and software (e.g., software as a service) configured to store and manage secondary data that is a replica of the primary data, such as replicated files, snapshots, etc. When write operations are executed upon files of the first computing environment, the order with which the write operations were executed should be preserved when the write operations are replicated to the second computing environment, otherwise a divergence and data discrepancy will occur. Overlapping writes occur when there are multiple parallel write operations that have overlapping ranges (e.g., two operations that target overlapping data block ranges of a file).

Overlapping write managers are used to maintain the order of write operations, such as by tracking overlapping writes that are executed at the first computing environment so that the overlapping writes are executed in a same order at the second computing environment. When an overlapping write manager determines that there are overlapping writes that are to modify data within overlapping ranges, then the overlapping write manager will obtain and use range locks for the overlapping writes. A range lock is used to ensure that only one write operation is allowed to access a range locked by the range lock, while other write operations are queued for subsequently obtaining the range lock in order to execute. The range lock only allows one write operation (e.g., a write operation holding/owning the range lock) to access a locked range at a time. In this way, the parallel overlapping writes are serially executed using the range lock. A range lock is file handle specific, and thus works for a single file. Computing resource overutilization can occur as more files require range locks. Thus, the handling of overlapping write operations is improved by managing the allocation of overlapping write managers in a resource efficient manner.

Accordingly, an overlapping write allocator 402 is initialized for managing the allocation and recycling of overlapping write managers. At 302, the overlapping write allocator 402 pre-allocates a percentage of overlapping write managers, of a total number of overlapping write managers, as available for managing overlapping writes targeting files stored by the first computing environment and replicated to replicated files stored by the second computing environment. In an example, resources from a free pool of resources 404 are used by the overlapping write allocator 402 to pre-allocate overlapping write managers as allocated overlapping write managers 406 available for managing overlapping writes. For example, an overlapping write manager (A) 408, an overlapping write manager (B) 410, an overlapping write manager (C), and/or other overlapping write managers are pre-allocated and ready for managing overlapping writes.

At 304, a mapping 414 is used to track the allocated overlapping write managers 406 drawn/allocated by the overlapping write allocator 402. The overlapping write managers 406 are used to obtain range locks on files. Thus, the mapping 414 is indexed with file handles as a key. In this way, a file handle of a file can be used to query the mapping 414 to determine whether the mapping 414 comprises an entry mapping the file handle to an overlapping write manger currently allocated for obtaining range locks on the file. For example, the overlapping write manager (A) 408 may be allocated for managing writes targeting a file (5) having a file handle of file ID (5), and thus the mapping 414 comprises a first entry 416 mapping the overlapping write manager (A) 408 to the file handle of the file (5). The overlapping write manager (B) 410 may be allocated for managing writes targeting a file (7) having a file handle of file ID (7), and thus the mapping 414 comprises a second entry 418 mapping the overlapping write manager (B) 410 to the file handle of the file (7). The overlapping write manager (C) 412 may be allocated for managing writes targeting a file (2) having a file handle of file ID (2), and thus the mapping 414 comprises a third entry 420 mapping the overlapping write manager (C) 412 to the file handle of the file (2).

When a write request 422, targeting a file within the first computing environment that is to be replicated as a replicated write request targeting a replicated file in the second computing environment, is received, the mapping 414 is used to determine whether an overlapping write manager is already allocated for the file, as illustrated in FIG. 4B. In particular, the mapping 414 is evaluated using a file handle of the file targeted by the write request to determine whether the mapping 414 comprises an entry mapping the file handle to an overlapping write manager, at 306. For example, the write request 422 targets the file (7) with the file handle of file ID (7). The mapping 414 is queried using the file handle of file ID (7) to determine whether the mapping 414 comprises an entry mapping the file handle of file ID (7) to an overlapping write manager. For example, the second entry 418 maps the file handle of file ID (7) to the overlapping write manager (B) 410, and thus the overlapping write manager (B) 410 is already allocated for managing write requests targeting the file (7).

Since the overlapping write manager (B) 410 is already allocated for managing write requests targeting the file (7), the overlapping write manager (B) 410 is used to acquire a range lock for a range of the file (7) targeted by the write request 422, at 308. At 310, the overlapping write manager (B) 410 uses the range lock to serially execute the write request 422 upon the file (7) with respect to other write operations targeting the file (7) (e.g., write operations targeting overlapping ranges of the file (7)) and replicate the write request 422 to the second computing environment for serial execution upon a replicated file (7) (e.g., serial execution of replicate write operations at the second computing environment according to an order at which write operations were executed by the first computing environment). The overlapping write manager (B) 410 uses the range lock to block overlapping writes targeting at least a portion of the range of the file (7) targeted by the write request 422 and/or a corresponding portion of the replicated file (7) targeted by the replicated write request. In an example, the range lock is released based upon the write request 422 finishing execution upon the file (7) at the first computing environment and being replicated to the replicated file (7) at the second computing environment.

In an example, a second write request 426 is received, as illustrated by FIG. 4C. The mapping 414 is queried using a file handle of file ID (9) of a file (9) targeted by the second write request 426. Because the mapping 414 does not comprise an entry for the file handle of file ID (9), there is no allocated overlapping write manager for the file (9). Accordingly, the overlapping write allocator 402 creates a new overlapping write manager (D) 428 for use for managing overlapping write requests targeting the file (9) having the file handle of file ID (9). Accordingly, the new overlapping write manager (D) 428 is used to obtain a range lock for a range of the file (9) targeted by the second write request 426. In this way, the range lock is used to serially execute the second write request 426 upon the file (9) and replicate the second write request 426 for serial execution upon a replicated file (9) of the second computing environment. A new entry 430 is created within the mapping 414 to map the file handle of file ID (9) to the new overlapping write manager (D) 428.

In an example, additional overlapping write managers are pre-allocated from the free pool of resources 404 based upon a current allocation of used overlapping write managers exceeding a threshold. For example, when an outstanding allocation grows beyond the threshold (e.g., a watermark of 10%, 20%, etc.), then more overlapping write managers are pre-allocated and ready to use.

Dynamic recycling of overlapping write managers may be initiated based upon various criteria, such as based upon a range lock being released and/or a current allocation of overlapping write manager exceeding a threshold (e.g., over 50%). In an example, an entry within the mapping 414 for an overlapping write manager is removed and the overlapping write manager is deallocated (e.g., resources are released back to the free pool of resources 404) based upon no outstanding writes having range locks for a file having a file handle to which the overlapping write manager is mapped by the entry. In an example, an entry is removed within the mapping 414 for an overlapping write manager based upon no outstanding writes having references to overlapping write managers, where the references correspond to attempts by outstanding writes to acquire range locks for a file having a file handle to which the overlapping write manager is mapped by the entry.

In an example where the total number of overlapping write managers (e.g., free resources) available for allocation/pre-allocation are maintained with the free pool of resources 404, a number of allocated overlapping write managers 406 is reduced to free computing resources back to the free pool of resources 404. In an example, overlapping write managers are deallocated (recycled) until a number of allocated overlapping write managers 406 is less than a threshold such as 20%.

Figure 5:
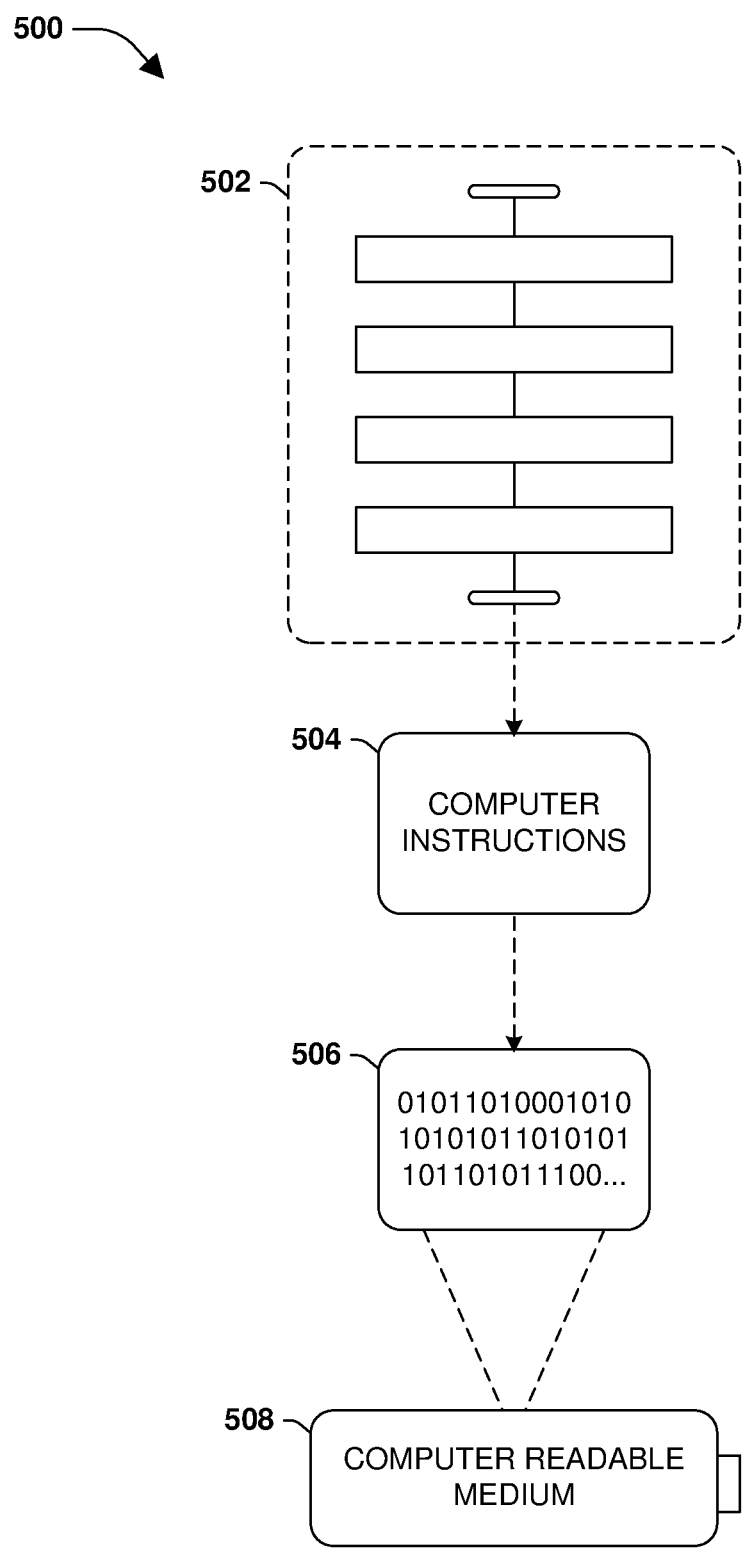
FIG. 5 is an example of a computer readable medium in which an embodiment of the invention may be implemented.

Still another embodiment involves a computer-readable medium 500 comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4C, for example. Many such computer-readable media are contemplated to operate in accordance with the techniques presented herein.

Figure 6:
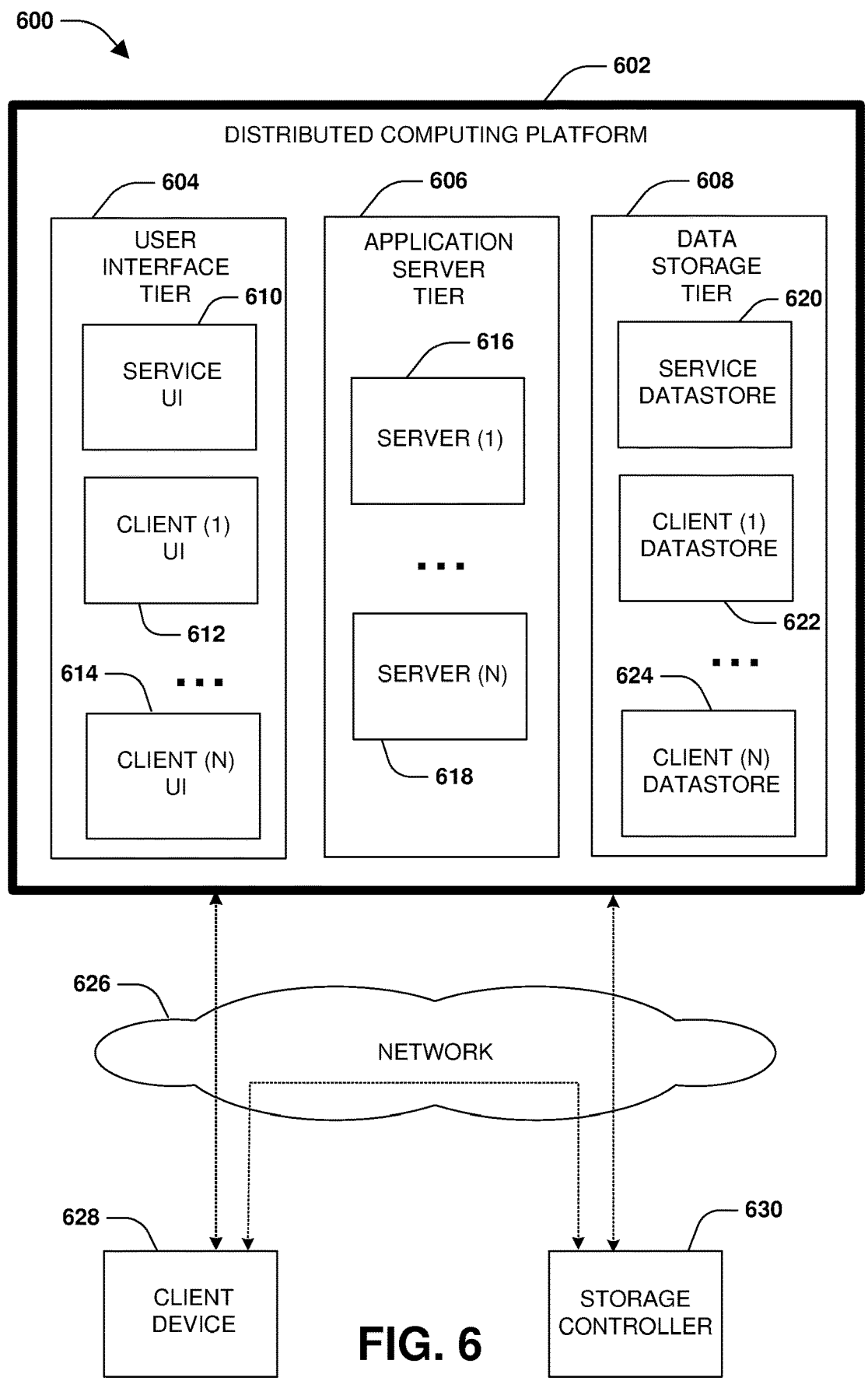
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SVMs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   allocating a number of overlapping write managers as available for managing overlapping writes targeting files stored by a first computing environment, where the overlapping writes are replicated to replicated files stored by a second computing environment;
   evaluating a mapping, used to track the allocated overlapping write mangers, using a file handle of a file targeted by an incoming write to determine whether an overlapping write manager from among the allocated overlapping write managers is already allocated for the file handle;
   in response to determining that the overlapping write manager is allocated for the file handle, utilizing the overlapping write manager to acquire a range lock for a range of the file to be modified by the incoming write; and
   executing the incoming write upon the file and replicating the incoming write to a replicated file, wherein the incoming write uses the range lock to block overlapping writes targeting at least a portion of the range of the file.

2. The method of claim 1, comprising:
   allocating a new overlapping write manager for the file handle based upon the mapping lacking an entry for the file handle of the file.

3. The method of claim 2, comprising:
   using the new overlapping write manager to acquire the range lock for serially executing the incoming write and replicating the incoming write.

4. The method of claim 2, comprising:
   creating a new entry within the mapping to track the new overlapping write manager allocated for the file handle.

5. The method of claim 1, comprising:
   pre-allocating additional overlapping write managers from a total number of overlapping write managers based upon a current allocation of used overlapping write managers exceeding a threshold.

6. The method of claim 1, comprising:
   releasing the range lock based upon the incoming write finishing execution upon the file and the replicated file.

7. The method of claim 6, comprising:
   removing an entry within the mapping for the overlapping write manager and deallocating the overlapping write manager based upon no outstanding writes having range locks for the file.

8. The method of claim 6, comprising:
   removing an entry within the mapping for the overlapping write manager and deallocating the overlapping write manager based upon no outstanding writes having references to the overlapping write manager, wherein the references correspond to attempts by outstanding writes to acquire range locks for the file.

9. The method of claim 1, wherein a total number of overlapping write managers is maintained within a pool, and the method comprising:
   reducing a number of allocated overlapping write managers from the pool to free computing resources.

10. The method of claim 1, comprising:
    deallocating overlapping write managers until a number of allocated overlapping write mangers is less than a threshold.

11. A non-transitory machine readable medium comprising instructions for performing a method, which when executed by a machine, causes the machine to:
    allocate a number of overlapping write managers as available for managing overlapping writes targeting files stored by a first computing environment, where the overlapping writes are replicated to replicated files stored by a second computing environment;
    evaluate a mapping, used to track the allocated overlapping write mangers, using a file handle of a file targeted by an incoming write to determine whether an overlapping write manager from among the allocated overlapping write managers is already allocated for the file handle;

in response to determining that the overlapping write manager is allocated for the file handle, utilize the overlapping write manager to acquire a range lock for a range of the file to be modified by the incoming write; and execute the incoming write upon the file and replicating the incoming write to a replicated file, wherein the incoming write uses the range lock to block overlapping writes targeting at least a portion of the range of the file.

12. The non-transitory machine readable medium of claim 11, wherein the instructions cause the machine to:
allocate a new overlapping write manager for the file handle based upon the mapping lacking an entry for the file handle of the file.

13. The non-transitory machine readable medium of claim 12, wherein the instructions cause the machine to:
use the new overlapping write manager to acquire the range lock for executing the incoming write and replicating the incoming write.

14. The non-transitory machine readable medium of claim 12, wherein the instructions cause the machine to:
create a new entry within the mapping to track the new overlapping write manager allocated for the file handle.

15. The non-transitory machine readable medium of claim 11, wherein the instructions cause the machine to:
pre-allocate additional overlapping write managers from a total number of overlapping write managers based upon a current allocation of used overlapping write managers exceeding a threshold.

16. A computing device comprising:
a memory comprising machine executable code for performing a method; and
a processor coupled to the memory, the processor configured to execute the machine executable code to cause the processor to:
allocate a number of overlapping write managers as available for managing overlapping writes targeting files stored by a first computing environment, where the overlapping writes are replicated to replicated files stored by a second computing environment;
evaluate a mapping, used to track the allocated overlapping write mangers, using a file handle of a file targeted by an incoming write to determine whether an overlapping write manager from among the allocated overlapping write managers is already allocated for the file handle;
in response to determining that the overlapping write manager is allocated for the file handle, utilize the overlapping write manager to acquire a range lock for a range of the file to be modified by the incoming write; and
execute the incoming write upon the file and replicating the incoming write to a replicated file, wherein the incoming write uses the range lock to block overlapping writes targeting at least a portion of the range of the file.

17. The computing device of claim 16, wherein the machine executable code causes the processor to:
release the range lock based upon the incoming write finishing execution upon the file and the replicated file.

18. The computing device of claim 17, wherein the machine executable code causes the processor to:
remove an entry within the mapping for the overlapping write manager and deallocating the overlapping write manager based upon no outstanding writes having range locks for the file.

19. The computing device of claim 17, wherein the machine executable code causes the processor to:
remove an entry within the mapping for the overlapping write manager and deallocating the overlapping write manager based upon no outstanding writes having references to the overlapping write manager, wherein the references correspond to attempts by outstanding writes to acquire range locks for the file.

20. The computing device of claim 16, wherein the machine executable code causes the processor to:
reduce a number of allocated overlapping write managers from a pool to free computing resources.

* * * * *